(12) United States Patent
Pendakur et al.

(10) Patent No.: US 8,209,574 B2
(45) Date of Patent: *Jun. 26, 2012

(54) CORRECTING FOR DATA LOSSES WITH FEEDBACK AND RESPONSE

(75) Inventors: Ramesh Pendakur, Hillsboro, OR (US); Jason C. Hallford, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1130 days.

This patent is subject to a terminal disclaimer.

(21) Appl. No.: 12/072,323

(22) Filed: Feb. 25, 2008

(65) Prior Publication Data

US 2008/0148123 A1    Jun. 19, 2008

Related U.S. Application Data

(63) Continuation of application No. 09/895,433, filed on Jun. 29, 2001, now Pat. No. 7,363,569.

(51) Int. Cl.
*H04L 1/16* (2006.01)
(52) U.S. Cl. ...................................................... 714/748
(58) Field of Classification Search .................... 714/748
See application file for complete search history.

(56) References Cited

U.S. PATENT DOCUMENTS

| | | |
|---|---|---|
| 4,602,279 A | 7/1986 | Freeman |
| 5,075,771 A | 12/1991 | Hashimoto |
| 5,155,591 A | 10/1992 | Wachob |
| 5,303,234 A | 4/1994 | Kou |
| 5,410,344 A | 4/1995 | Graves et al. |
| 5,426,513 A | 6/1995 | Scorse et al. |
| 5,444,499 A | 8/1995 | Saitoh |
| 5,446,919 A | 8/1995 | Wilkins |
| 5,457,808 A | 10/1995 | Osawa et al. |
| 5,483,278 A | 1/1996 | Strubbe et al. |
| 5,534,911 A | 7/1996 | Levitan |
| 5,559,549 A | 9/1996 | Hendricks et al. |
| 5,563,895 A | 10/1996 | Malkamaki et al. |
| 5,564,088 A | 10/1996 | Saitoh |
| 5,585,838 A | 12/1996 | Lawler et al. |
| 5,594,490 A | 1/1997 | Dawson et al. |
| 5,600,364 A | 2/1997 | Hendricks et al. |
| 5,664,091 A | 9/1997 | Keen |
| 5,680,322 A | 10/1997 | Shinoda |

(Continued)

FOREIGN PATENT DOCUMENTS

EP    0902569    3/1999

(Continued)

OTHER PUBLICATIONS

"U.S. Appl. No. 09/895,433" *U.S. Office Action*, (Jun. 1, 2007), 8 pages.

(Continued)

*Primary Examiner* — Stephen Baker
(74) *Attorney, Agent, or Firm* — Blakely, Sokoloff, Taylor & Zafman LLP

(57) ABSTRACT

A digital content transmission and reception system that uses feedback and re-transmission of missing content is described. A content transmission system broadcasts a complete set of digital content to a plurality of content reception systems via a communication link. A content reception system receives a corresponding incomplete set of digital content, determines particular content portions that are missing, and provided feedback indicating the missing content portions to the content distribution system. The content distribution system the re-transmits content based on the feedback.

23 Claims, 12 Drawing Sheets

U.S. PATENT DOCUMENTS

| | | | |
|---|---|---|---|
| 5,686,954 A | 11/1997 | Yoshinobu et al. | |
| 5,689,439 A | 11/1997 | Weerackody et al. | |
| 5,724,345 A | 3/1998 | Guameri et al. | |
| 5,727,002 A | 3/1998 | Miller et al. | |
| 5,751,282 A | 5/1998 | Girard et al. | |
| 5,768,681 A | 6/1998 | Dan et al. | |
| 5,778,182 A | 7/1998 | Cathey et al. | |
| 5,790,935 A | 8/1998 | Payton | |
| 5,801,747 A | 9/1998 | Bedard | |
| 5,801,753 A | 9/1998 | Eyer et al. | |
| 5,838,668 A | 11/1998 | Okada et al. | |
| 5,838,678 A | 11/1998 | Davis et al. | |
| 5,845,090 A | 12/1998 | Collins et al. | |
| 5,867,799 A | 2/1999 | Lang et al. | |
| 5,918,002 A | 6/1999 | Klemets et al. | |
| 5,918,022 A | 6/1999 | Batz et al. | |
| 5,920,700 A | 7/1999 | Gordon et al. | |
| 5,928,330 A | 7/1999 | Goetz et al. | |
| 5,930,493 A | 7/1999 | Ottesen et al. | |
| 5,937,411 A | 8/1999 | Becker | |
| 5,940,738 A | 8/1999 | Rao | |
| 5,945,988 A | 8/1999 | Williams et al. | |
| 5,963,551 A | 10/1999 | Minko | |
| 5,973,683 A | 10/1999 | Cragun et al. | |
| 5,977,964 A | 11/1999 | Williams et al. | |
| 5,991,841 A | 11/1999 | Gafken et al. | |
| 5,999,526 A | 12/1999 | Garland et al. | |
| 6,002,393 A | 12/1999 | Hite et al. | |
| 6,002,852 A | 12/1999 | Birdwell et al. | |
| 6,005,597 A | 12/1999 | Barrett et al. | |
| 6,006,247 A | 12/1999 | Browning et al. | |
| 6,018,768 A | 1/2000 | Ullman et al. | |
| 6,020,883 A | 2/2000 | Herz et al. | |
| 6,021,433 A | 2/2000 | Payne et al. | |
| 6,025,837 A * | 2/2000 | Matthews et al. | 715/721 |
| 6,055,560 A | 4/2000 | Mills et al. | |
| 6,085,252 A | 7/2000 | Zhu et al. | |
| 6,085,253 A | 7/2000 | Blackwell et al. | |
| 6,088,722 A | 7/2000 | Herz et al. | |
| 6,108,645 A | 8/2000 | Eichstaedt et al. | |
| 6,111,896 A * | 8/2000 | Slattery et al. | 370/535 |
| 6,114,376 A | 9/2000 | Prichard et al. | |
| 6,119,189 A | 9/2000 | Gafken et al. | |
| 6,125,259 A | 9/2000 | Perlman | |
| 6,131,127 A | 10/2000 | Gafken et al. | |
| 6,141,785 A | 10/2000 | Hur et al. | |
| 6,144,376 A | 11/2000 | Connelly | |
| 6,148,005 A | 11/2000 | Paul et al. | |
| 6,160,989 A | 12/2000 | Hendricks et al. | |
| 6,184,918 B1 | 2/2001 | Goldschmidt Iki et al. | |
| 6,233,283 B1 | 5/2001 | Chiu et al. | |
| 6,279,040 B1 | 8/2001 | Ma et al. | |
| 6,289,012 B1 | 9/2001 | Harrington et al. | |
| 6,289,510 B1 | 9/2001 | Nakajima | |
| 6,298,482 B1 | 10/2001 | Seidman et al. | |
| 6,304,578 B1 | 10/2001 | Fluss | |
| 6,317,881 B1 | 11/2001 | Shah-Nazaroff et al. | |
| 6,349,321 B1 | 2/2002 | Katayama | |
| 6,357,028 B1 | 3/2002 | Zhu | |
| 6,359,557 B2 | 3/2002 | Bilder | |
| 6,359,571 B1 | 3/2002 | Endo et al. | |
| 6,374,405 B1 | 4/2002 | Willard | |
| 6,378,036 B2 | 4/2002 | Lerman et al. | |
| 6,389,593 B1 | 5/2002 | Yamagishi | |
| 6,397,387 B1 | 5/2002 | Rosin et al. | |
| 6,424,625 B1 | 7/2002 | Larsson et al. | |
| 6,430,608 B1 | 8/2002 | Shaio | |
| 6,434,747 B1 | 8/2002 | Khoo et al. | |
| 6,449,632 B1 | 9/2002 | David et al. | |
| 6,449,654 B1 | 9/2002 | Blackwell et al. | |
| 6,457,010 B1 | 9/2002 | Eldering et al. | |
| 6,460,036 B1 | 10/2002 | Herz | |
| 6,467,089 B1 | 10/2002 | Aust et al. | |
| 6,480,783 B1 | 11/2002 | Myr | |
| 6,490,722 B1 | 12/2002 | Barton et al. | |
| 6,513,069 B1 | 1/2003 | Abato et al. | |
| 6,516,192 B1 | 2/2003 | Spaur et al. | |
| 6,526,455 B1 | 2/2003 | Kamimura | |
| 6,529,526 B1 | 3/2003 | Schneidewend | |
| 6,557,042 B1 | 4/2003 | He et al. | |
| 6,570,843 B1 | 5/2003 | Wolfgang | |
| 6,571,389 B1 | 5/2003 | Spyker et al. | |
| 6,574,518 B1 | 6/2003 | Lounsberry et al. | |
| 6,577,599 B1 | 6/2003 | Gupta et al. | |
| 6,578,199 B1 | 6/2003 | Tsou et al. | |
| 6,587,985 B1 | 7/2003 | Fukushima et al. | |
| 6,594,682 B2 | 7/2003 | Peterson et al. | |
| 6,601,237 B1 | 7/2003 | Ten Kate et al. | |
| 6,617,980 B2 | 9/2003 | Endo et al. | |
| 6,643,322 B1 | 11/2003 | Varma et al. | |
| 6,662,330 B1 | 12/2003 | Hershey | |
| 6,678,890 B1 | 1/2004 | Cai | |
| 6,792,470 B2 | 9/2004 | Hakenberg et al. | |
| 6,842,461 B2 | 1/2005 | Harris | |
| 6,850,559 B1 | 2/2005 | Driessen et al. | |
| 6,970,127 B2 * | 11/2005 | Rakib | 341/173 |
| 7,058,027 B1 | 6/2006 | Alessi et al. | |
| 2001/0012299 A1 | 8/2001 | Dahlen | |
| 2001/0013127 A1 | 8/2001 | Tomita et al. | |
| 2001/0037507 A1 | 11/2001 | Mori | |
| 2002/0156912 A1 | 10/2002 | Hurst et al. | |
| 2003/0004955 A1 | 1/2003 | Cedola et al. | |

FOREIGN PATENT DOCUMENTS

| | | |
|---|---|---|
| EP | 1028551 | 8/2000 |
| EP | 1043892 | 10/2000 |
| EP | 1089201 | 4/2001 |
| EP | 1089571 | 4/2001 |
| WO | WO-9726729 | 7/1997 |
| WO | WO-9944159 | 9/1999 |
| WO | WO-9965237 | 12/1999 |
| WO | WO-0001149 | 1/2000 |
| WO | WO-0059204 | 10/2000 |
| WO | WO-0064165 | 10/2000 |
| WO | WO-0105449 | 3/2001 |
| WO | WO-0115451 | 3/2001 |
| WO | WO-0117195 | 3/2001 |
| WO | WO-0172042 | 9/2001 |
| WO | WO-0193524 | 12/2001 |
| WO | WO-0248863 | 6/2002 |
| WO | WO-02103940 | 12/2002 |
| WO | WO-02103941 | 12/2002 |
| WO | WO-02104030 | 12/2002 |
| WO | WO-02104031 | 12/2002 |
| WO | WO-03030540 | 4/2003 |
| WO | WO-03061245 | 7/2003 |
| WO | WO-03028381 | 8/2003 |

OTHER PUBLICATIONS

"PCT International Search Report", PCT/US01/43862, (Dec. 4, 2003), 1-4.

"PCT International Search Report", PCT/US02/17270, (Jun. 3, 2003), 1-4.

"PCT International Search Report", PCT/US02/17381, (Oct. 20, 2003), 1-6.

"PCT International Search Report", PCT/US02/17316, (Nov. 6, 2002), 1-8.

"PCT International Search Report", PCT/US02/29091, (Apr. 3, 2003) 1-5.

"PCT International Search Report", PCT/US02/29099, (Mar. 28, 2003), 1-4.

"PCT International Search Report", PCT/US03/00169, (Jun. 2, 2003), 1-4

Advanced Television Systems Comm, "Program and System Information Protocol for Terrestrial Broadcast and Cable (Revision A) and Amendment No. 1", *Advanced Television Systems Committee Doc. A/65A*, Dec. 23, 1997, Rev. A pp. a-e and pp. 1-135, (May 31, 2000), pp. a-e & 1-135.

CISCO.COM, "Internet Protocol (IP) Mutlicast Technology Overview", http://www.cisco.com/warp/_public/cc/pd/iosw/tech/ipmu_ov/htm, Whitepaper Cisco Systems, Inc. Posted Jun. 27, 2001. Retrieved on Jun. 29, 2001., pp. 1-16.

European Broadcasting Union, "Digital Video Broadcasting(DVB); Specifications for Service Information (SI) in DVB systems", *Euro-* pean Broadcasting Union ETSI EN 300 468 V1.4.1 (Nov. 2000), France Copyright 2000., pp. 1-83.

Gummalla, Ajay Chandra V., "An Access Protocol for a Wireless Home Network", *IEEE*, Wireless Communications and Networking Conference, Sep. 21, 1999, 1392-1396.

Hartwig, Stephan, et al., "Broadcasting and Processing of Program Guides for Digital TV", *SMPTE Journal, SMPTE, Inc.*, vol. 106, No. 10, Scarsdale, NY, XP000668926, (Oct. 1997), 727-732.

Haskell, Barry G., et al., "Digital Video; An Introduction to MPEG-2", Chapman and Hall, New York NY, (1997) pp. 280-283.

Haubner, Dr. P., et al., "Netzdienste fur Multimediale Anwendungen CSCW—MBone", *Teleseminar: Multimedia Systeme—Technologie and Gestaltung WS 95/96*, XP002248684, (1996), 1-20.

Holfeder, Wieland, "Interactive Remote Recording and Playback of Multicast Videoconferences", XP002088645, (Sep. 10, 1997), 450-463.

Hu, Qinglong, et al., "Power Conservative Multi-Attribute Queries on Data Broadcast", *IEEE*, Data Engineering, 16th International Confererence, San Diego, Calif., (2000), 157-177.

Hwang, Ren-Hung, et al., "Scheduling Policies for an VOD System over CATV Networks", *IEEE*, Department of Computer Science & Information Engineering, (1997), 438-442.

Int'l Org. for Standardization, "Information Technology—Generic Coding of Moving Pictures and Assodiated Audio: Systems, Recommendation H.222.0, ISO/IEC 13818-1", *Int'l Org. for Standardization, Coding of Moving Pictures and Associated Audio*, N0801, XP002033056, (Nov. 13, 1994), 161 pp.

Intel Corporation, "Client Infrastructure for Internet-Based Data Services for Digital Television; Enabling a New Class of DTV Services", *INTEL: Intel Architecture*, (2000), pp. 1-10.

Intel Corporation, "Internet and Broadcast: The Key to Digital Convergence. Utilizing Digital Technology to Meet Audience Demand", *INTEL: Intel Architecture Labs*, (2000), pp. 1-4.

INTEL.COM, "Enhanced Digital Broadcast", http://www.developer.intel.com/ial/home/digentertain/edb.htm., Retrieved on the internet on Aug. 21, 2001. IAL Digitial Entertainment, pp. 1-3.

REPLAYTV.COM, "Competitive Difference ReplayTV Rules Here's Why . . . ", www.replaytv.com/overview/differences.htm, (Mar. 21, 2000), pp. 1-2.

REPLAYTV.COM, "Features Your Time, Your Schedule", www.replaytv.overview/features/htm., Retrieved on Mar. 21, 2000., pp. 1-2.

REPLAYTV.COM, "Frequently Asked Questions. Will ReplayTV make me more popular? And other frequently asked questions.", www.replaytv.com/overview/faqs.htm, retrieved on Mar. 21, 2001, pp. 1-4.

REPLAYTV.COM, "ReplayTV: Features/Benefits", www.replaytv.com/overview/details.htm., Retrieved on Mar. 21, 2000., pp. 1-3.

REPLAYTV.COM, "Technical Specifications", www.replaytv.com/overview/techspecs.htm., Retrieved on Mar. 21, 2000., p. 1.

REPLAYTV.COM, "What is ReplayTV? Introducing the new ReplayTV 2020", www.replaytv.com/overview/index.htm., Retrieved on Mar. 21, 2000., p. 1.

Smyth, B, at al., "A Personalized Television Listings Service", *Communications of the ACM*, vol. 43, No. 8, (Aug. 2000), pp. 107-111.

TIVO.COM, "Channel SURF in a whole new way", http://www.tivo.com/what/intro4/html, [retrieved on Mar. 21, 2000], p. 1.

TIVO.COM, "Control Live TV", http://www.tivo.com/what/intro2/html, [retrieved on Mar. 21, 2000], p. 1.

TIVO.COM, "Digital Recording without the Tape", http://www.tivo.com/what/intro5/html, [retrieved on Mar. 21, 2000], p. 1.

TIVO.COM, "Frequently Asked Questions", http://www.tivo.com/what/faq_sub.html., Retrieved on Mar. 21, 2000., pp. 1-9.

TIVO.COM, "Product Specifications", http://www.tivo.com/what/how2html, [retrieved on Mar. 21, 2000], p. 1.

TIVO.COM, "What is TiVo? Introduction to TiVo. Something Good is Always On", http://www.tivo.com/what/intro3.html, (Mar. 21, 2000), 1.

TIVO.COM, "What is TiVo? Introduction to TiVo. A Better Way to Watch TV", http://www.tivo.com/what/intro/html, Retrieved on Mar. 21, 2000., p. 1.

TIVO.COM, "What you want, When you want it", http://www.tivo.com/what/how/html., Retrieved on Mar. 21, 2000., p. 1.

Wittig, Hartmut, et al., "Intelligent Media Agents in Interactive Television Systems", *IEEE*, Proceedings of the Int'l Conf. on Multimedia Computing and Systems, Los Angeles, CA XP000603484, (May 15, 1995), 182-189.

* cited by examiner

CORRECTING FOR DATA LOSSES WITH FEEDBACK AND RESPONSE

The present application is a continuation of U.S. patent application No. 09/895,433, filed on Jun. 29, 2001, now U.S. Pat. No. 7,363,569, entitled "Correcting for Data Losses with Feedback and Response". U.S. patent application Ser. No. 09/895,433 is hereby incorporated entirely herein by reference.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright © 2001, Intel Corporation, All Rights Reserved.

BACKGROUND OF THE INVENTION

1. Field of the Invention

The invention relates generally to data transmission and reception. More particularly, the invention relates to a system and method for transmitting digital content and receiving feedback indicative of the lost content that was not adequately received.

2. Background Information

Television data is frequently lost during transmission. The potential causes are numerous and include known causes, such as physical disturbances (e.g., buildings), weather, electromagnetic interference and other known causes and intangible or unknown causes. Such losses, regardless of the cause, may significantly reduce the quality and entertainment value of the television viewing experience.

FIG. 1 conceptually illustrates a prior art television broadcast system 100. A tower 110 transmits television data 120 through the atmosphere. Typically, the transmission of the television data 120 experiences losses due to multiple factors or data transmission interferences. Exemplary interference 130 conceptually represents an electromagnetic interference such as may be caused by an electrical storm proximate to the path of transmission. The interference 130 causes a portion 140 of the initially transmitted television data 120 to be lost, so that only a portion 150 is actually received by television set 160. Accordingly, the television set 160 presents only the received data 150 together with an associated loss of quality 170. By way of example, the loss of quality 170 may appear as static, noise, video or audio interruption, or similar losses known to television viewers. These losses result in a poor or degraded viewing experience for the television viewer 180. The user 180 may accordingly prefer an improved system in which such losses are eliminated or mitigated.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION OF THE INVENTION

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Content Transmission and Reception Systems

Figure 1:
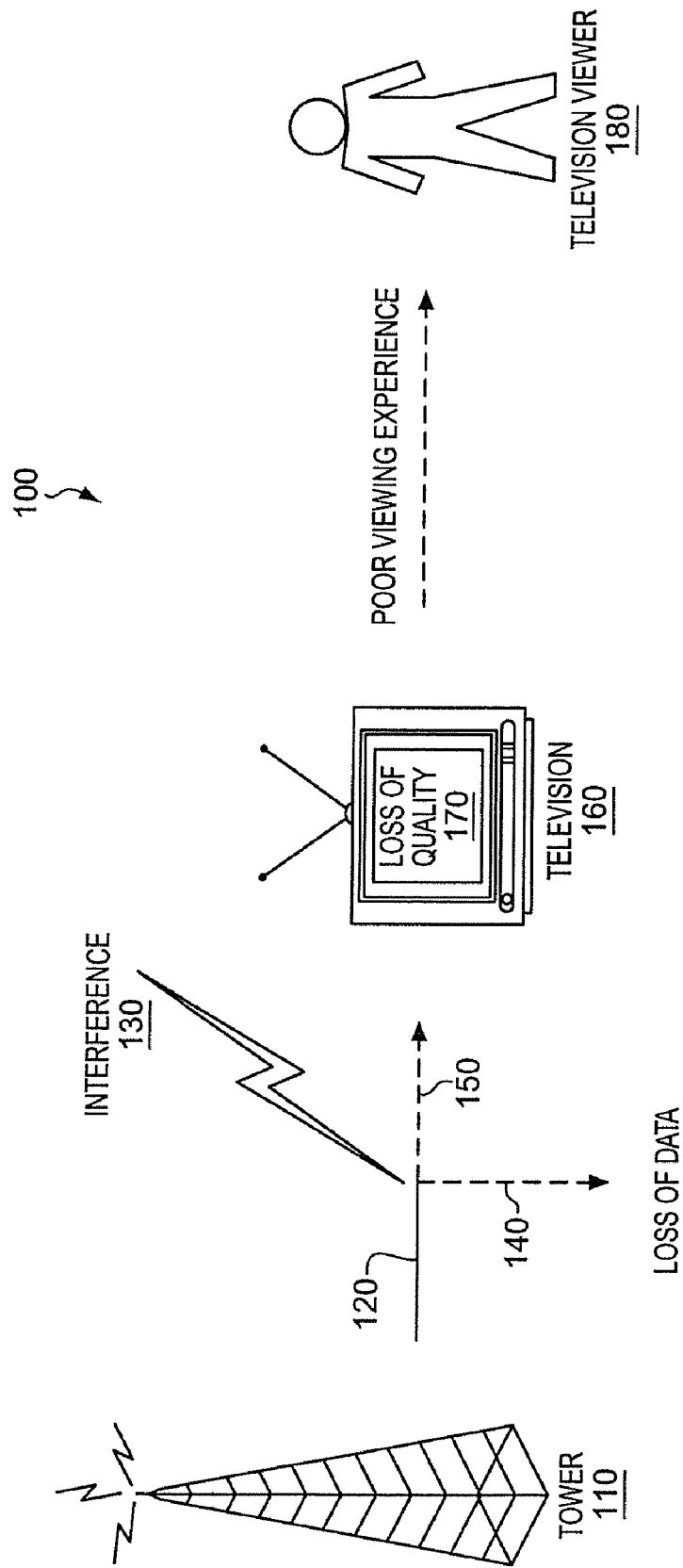
FIG. 1 conceptually illustrates a prior art television broadcast system.
Figure 2:
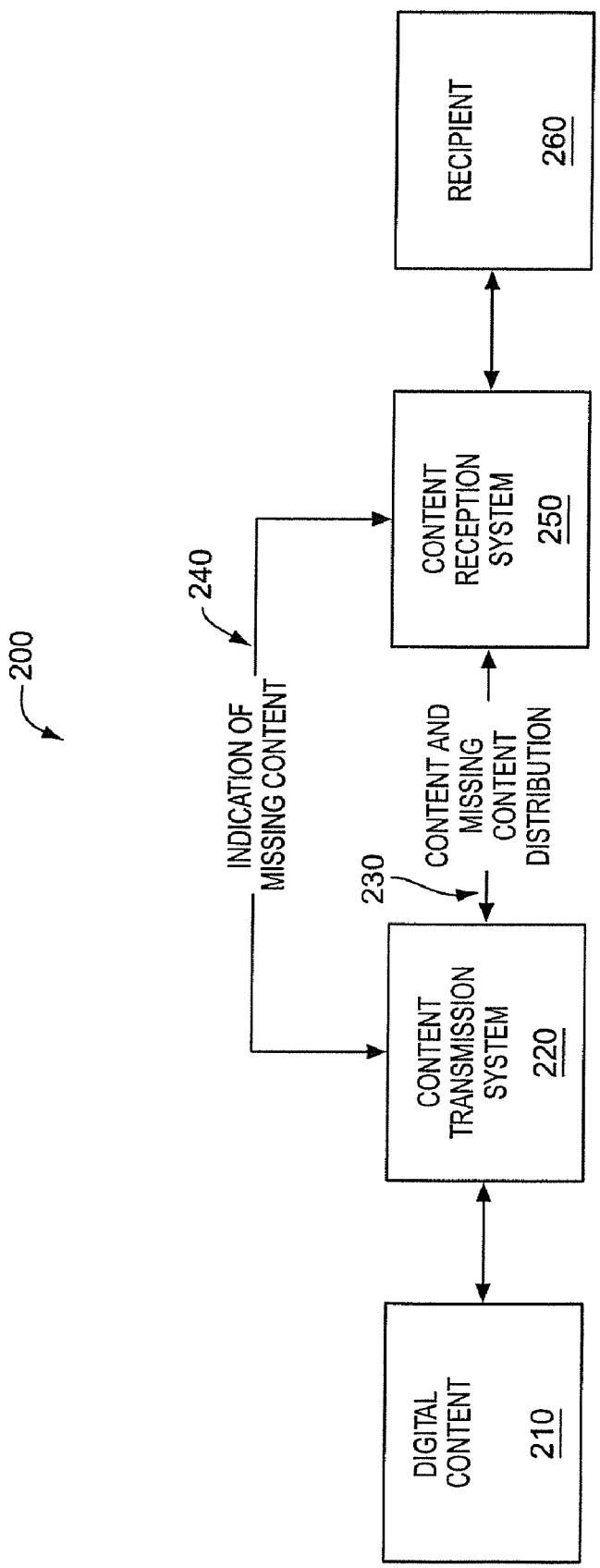
FIG. 2 conceptually illustrates a digital content transmission and reception system, according to one embodiment.

FIG. 2 conceptually illustrates a system 200, according to one embodiment, for transmitting and receiving digital content. As shown, digital content 210 is accessed and transmitted by content transmission system 220 to content reception system 250. The content reception system 250 is capable of detecting missing content and providing feedback indicating the missing content. The content transmission system 220 may re-transmit content, such as a portion of digital content 210, to the content reception system 250. The content reception system 250 provides the received content including any received missing content to a recipient 260. Advantageously, in this way, data losses due to a lossy transmission environment and other data losses may be at least partially corrected.

The digital content 210 may be any type of digital content desired for the particular implementation and is to be interpreted broadly. By way of example, the digital content 210 may be computer software, multimedia (e.g., movies, video on demand, video games), video, audio (e.g., MP3s), streaming audio video similar to television data, and other types of content (e.g., structured data). For example, the content 210 may be premier cached digital feature film content for delayed viewing. The digital content 210 has a digital format, which makes it possible to perform digital processing including electronic manipulation, compression, preservation, and perfect copying. For example, an identical copy of the digital content 210 may be created and a bit-wise comparison of the original and the copy may be used to verify that the two are identical.

The digital content 210 is in an electronically accessible format. Typically, the digital content 210 will exist as a computer file having a particular file format that is compatible, standard, or efficient for the type of content and will be stored in a memory. For example, in the case of an audio content, the file format may be an MP3 format and the content 210 may be stored in a memory representing an audio library. However, other embodiments are contemplated. For example, the digital content 210 may exist as a stream of digital data that is provided by a digital data generating device (e.g., a digital camera/recorder), an electronically connected source or provider (e.g., a news feed or a stock ticker), or another electronically connected entity. In any event, the digital content 210 is accessible to the content transmission system 220.

The content transmission system 220 accesses the digital content 210 and distributes it. The term "transmit" will be used broadly to refer to all transmission or transmission methods where a content containing machine-accessible signal is provided to content reception systems such as system 250. For example, transmitting may include broadcasting the signal simultaneously to multiple recipients (similarly to the way network television is broadcast) or narrowcast to specific recipients (similarly to cable television).

The content transmission system 220 may be any transmission system sufficient to transmit content and receive feedback including terrestrial, satellite, cable, and other transmission systems. The content transmission system 220 may contain hardware, firmware, and software, or any combination to access and transmit the digital content 210. The content transmission system 220 may have a processor to execute instructions, a memory to store content, an encoder to encode content, and a transmitter to transmit a content containing signal. According to one embodiment, conventional technologies may be used, together with any desirable modifications that will be apparent to those skilled in the art based on the discussion herein, to perform the actual transmission processing and transmission of the content. For example, as will be discussed in further detail elsewhere, in one embodiment, the digital content 210 may be divided into logical portions that are convenient for processing and transmission, converted to an MPEG-based format, and transmitted using a conventional data transmitter system.

According to one embodiment, the content transmission system 220 is a system to transmit the digital content 210 over a substantially one way communication link 230, in which the predominant or only direction of transmission is from the transmission system 220 to the reception system 250. In one case, the link 230 may be bidirectional, although typically, the link will be a substantially non-client-server link. A client server link would be typified by the reception system 250 issuing a request for content 210 and the transmission system 220 then issuing the content 210 in response, similarly to the way that web pages may be received using the Internet. In contrast, in a non-client-server link, the transmission system 220 may provide the digital content 210 without the request. That is, the content transmission system 220 may transmit content to the content reception system 250, and typically a plurality of other content reception systems simultaneously, without receiving a specific request that is processed and responded to or supplied.

Typically, the link 230 will be a link that is shared by multiple reception systems such as reception system 250. The link 230 may be based on a number of technologies, including satellite and dish, fiber optic, coaxial cable, and others. For example, the link 230 may be a one way electromagnetic radiation broadcast pipe in which the content 210 is simultaneously broadcast to all of the recipients connected with a network (e.g., having an antenna like rabbit ears or a satellite dish to receive the transmission) or narrowcast to a select group of recipients (e.g., having authorization to receive the transmission). The link 230 may carry a digital TV channel with a bandwidth of 19.39 megabits per second and may be partitioned among multiple channels such as four channels that each carry 4.85 megabits per second, which may carry either content or retransmitted content. For example, one of the four channels may be implemented as a regularly running low-bandwidth channel that constantly carries current resend missing packets.

The content reception system 250 typically adequately receives and stores only a subset of the transmitted content 210. The digital content 210 may comprise a totality of a plurality of ordered and sequenced portions and transmission or other losses may result in missing content which amount to holes or gaps in the received content. The term "missing content" is to be interpreted broadly as content that has not been adequately received. This includes content that has not been received, has not been received completely, or that has not been received without errors or other problems. Typically, a whole discrete portion of digital content will be lost or erroneous, although other embodiments are contemplated. These errors or losses result in content that has missing portions, holes, or gaps that may degrade the quality and reduce the usefulness of the content for many applications and uses.

The reception system 250 may attempt to correct for the missing portions by detecting, determining, or discovering the errors or missing portions and providing feedback identifying them to another system or component, typically belonging to or associated with the content transmission system 220, which in turn may provide at least some of the erroneous or missing portions to supplement the incomplete set of content. The content reception system 250 may be any system that is able to receive the content, determine when there is missing content, and provide feedback. The content reception system 250 may contain hardware, firmware, and software, or any combination to receive content and provide feedback. The content reception system 250 may have an interface to receive a content containing signal, a decoder to decode the signal, a memory to store the content, and a processor to execute instructions, such as missing content determination instructions. According to one embodiment, conventional technologies may be used, together with any desirable modifications that will be apparent to those skilled in the art based on the discussion herein, to receive the content and transmit feedback. By way of example, the content reception system 250 may comprise a personal computer coupled with a receiver (e.g., connected with an antenna), a digital television set having a memory and a processor, a television set with a set top box having a memory and a processor, a personal video recorder, and other computer systems. The content reception system 250 may have different levels of intelligence, as desired, such as intelligence to know to connect with the communication link (e.g., tune to a particular channel to receive a corresponding predetermined broadcast transmission) and to have intelligence to receive and use a schedule of content broadcasts (e.g., to use a conceptual TV guide of sorts).

The system 200 determines missing content. Determining missing content may include comparing information indicating a complete set of content with content that was adequately received to determine if any content indicated by the complete set has not been adequately received. The determination may be made by the content reception system 250 or by the content transmission system 220.

Consider an embodiment in which the content reception system 250 makes the determination of missing content. In this embodiment, the manifest is generated by the content transmission system 220, transmitted to and received by the content reception system 250, and used by the content reception system 250 to make the determination. Different types of manifests are contemplated, including manifests that list portions transmitted, portions before transmission, and others. The content reception system 250 may receive the manifest and implement a method that includes determining if any content portions indicated in the manifest have not been adequately received. Conceptually, and without limitation, the manifest may be a table of contents listing all the chapters in a book that the content reception system 250 may use to determine if all chapters listed in the table of contents have been adequately received. For example, a journaling agent of the reception system 250 uses a manifest indicating a complete set of content portions belonging to digital content 210 to determine what the missing or erroneous portions of a received incomplete set of digital content 210 are, and keeps a journal, record, or log of missing content, addresses of the missing content, sizes of the missing content, and other desired information.

The content reception system 250 provides feedback indicative of the missing content to the content transmission system 220. The phrase "indicative of the missing content" and related phrases will be used to refer to feedback indications that either directly indicate the missing content or that may be used to determine the missing content. In embodiments where the reception system 250 determines the missing content, the feedback will typically directly indicate the missing content. In embodiments in which the transmission system 220 determines the missing content, the feedback may include information that may be used by the transmission system 220 to determine the missing content. For example, the information may indicate all content portions that were adequately received by the reception system 250. With this information, the transmission system 220 may be able to determine missing content, such as by using a manifest, and by other approaches.

According to one embodiment, the feedback is provided by a second communication link 240. Typically, the second link 240 will communicate a smaller data load than the link 230, which results in reduced load at the transmission system 220. Accordingly, the link 240 may not need much bandwidth and may have less total bandwidth than the link 230. The link 240 may be such that the reception system 250 may provide the feedback affordably, without expensive, bulky, or otherwise undesirable transmission systems. The link 240 may be one way or bidirectional, as desired. Other desirable qualities for the link 240 of certain embodiments include existing availability to many residences and businesses, ease of installation or activation, low cost per unit bandwidth. According to one embodiment, the link 240 makes use of a wire-based link available at a business or residence associated with the reception system 250. For example, the link 240 may be based on a telephone line, coaxial cable, a cable line, all types of digital subscriber lines (xDSL), and others. The link may also be wireless, such as by cellular telephone, Very Small Aperture Terminal (VSAT), and others.

The content transmission system 220 is capable of receiving the feedback indicative of missing content and re-transmitting based on this feedback. Typically, the content will be re-transmitted on the communication link 230 to the content reception system 250, although re-transmission over the link 240 is also contemplated.

According to one embodiment, the content transmission system 220 includes novel software instructions to interpret the feedback and to re-transmit content based on the feedback. The software instructions may comprise retransmission instructions that interpret feedback indicative of content received or not received at the content reception system 250 and determine content to re-transmit to the content reception system 250.

The re-transmission instructions will typically depend on the business environment and objectives of the particular implementation. In one embodiment, the re-transmission instructions provide that all missing portions are resent. This may use the most bandwidth but may provide the best overall quality to the end consumer of the content. This may be preferred when the content is software programs, and in other situations. Alternatively, strategic subsets of content that is missing from the system 250 may be re-transmitted. The strategic subsets of the actual missing content may be determined based on weighting or ranking. The strategic subsets may also be determined based on how strongly the quality is affected. For example, missing content may be provided if a predetermined number or run-length of sequential portions are missing. The content distributor may also elect to determine content to re-transmit based on compliance with an acceptable or guaranteed level.

Determining content to re-transmit may also be based on feedback from multiple reception systems such as the content reception system 250. For example, in one embodiment, content is re-transmitted based on how frequently it is reported to be missing from multiple reception systems. For example, content may be re-transmitted if it is reported to be missing from N % of the multiple reception systems, where N % is a percentage that is suitable or desirable for the particular implementation. In this way, a majority of the missing content may be provided with a reduced bandwidth. This may be useful when broadcast errors are likely to effect the same missing content, such as by being dependent on the content, the time of transmission, the location of the reception system 250, and otherwise.

Alternatively, re-transmission may be performed according to numerous other motivations that are desired for the particular implementation and that will be apparent to those having an ordinary level of skill in the art based on the discussion contained herein. For example, the re-transmission of content may be based on user preferences indicated in the feedback.

Regardless of the particular implementation, bandwidth used to re-transmit data is of value to the transmission system 220, which may lease the bandwidth at great cost. The feedback loop provided by many embodiments permits missing data to be retransmitted according to instructions that take into consideration accurate knowledge of data that is actually missing from one or more receiving systems of users or clients. The transmission system 220 and the retransmission instructions may use this feedback to balance the bandwidth costs of re-transmission with its business objectives and motivations. This may provide better management and utilization of bandwidth than possible with systems that retransmit extra data due to a lack of knowledge of what data may be missing. Advantageously, this may allow improved revenue generation per bit of transmission bandwidth.

As desired, different re-transmission instructions may be used for different types of losses and for different types of content. For example, losses occurring predominantly over a period of time, such as due to signal interruption or due to a buffer filling up, may be processed differently compared with random or unordered losses dispersed chronologically throughout the content. Likewise, different processing may be used for audio compared to video. Accordingly, rules and policies may be developed with varying levels of sophistication, as desired.

The content reception system 250 receives the re-transmitted content and may use this content to reduce the amount of missing content. By way of example, if the content reception system 250 was initially missing content "A" and the re-transmitted content to system 250 included contents "A", "B", and "C", the system 250 may determine that the recently received content included missing content "A" and may selectively combine received content "A" with the previously received contents. In this way, the reception system 250 may selectively fill missing content with re-transmitted content.

After receiving any retransmitted content and combining the re-transmitted content with the previously received incomplete set of content, the content reception system 250 may provide the supplemented content to the recipient 260. The recipient 260 may be a human or system recipient of the digital content 210. For example, in the case where the content reception system 250 is capable of presenting the digital content 210 in a human consumable format (e.g., as video presented on a display device), the recipient 260 may be a user, subscriber, viewer, or listener. Alternatively, in cases where the reception system 250 does not have this capability, the recipient 260 may be a system such as a presentation device. For example, the recipient may be a digital television, a personal video recorder, a stereo, an MP3 player, a CD ROM burner, and other digital content recipients. Typically, the end result of the transmission, feedback, and re-transmission will be entertainment data that is consumed by humans, however the invention is not so limited.

The discussion above has been provided to illustrate, without limitation, the invention according to exemplary embodiments. Other embodiments are contemplated. For example, the feedback and re-transmission may be performed repeatedly until the missing data has been sufficiently reduced. Also, feedback may be provided as a viewer consumes the content and may be prioritized based on the difference between current time and expected consumption time when the missing content is needed. Additionally, although the re-transmission rules have been described for the content transmission system 220, the content reception system 250 may have varying levels of control of what and how much data is re-transmitted. For example, according to one embodiment, the content reception system 250 may apply user preferences, such as through a user profile, to control or modify the feedback based on user preferences and quality standards (e.g., may prioritize feedback based on content type).

Figure 3:
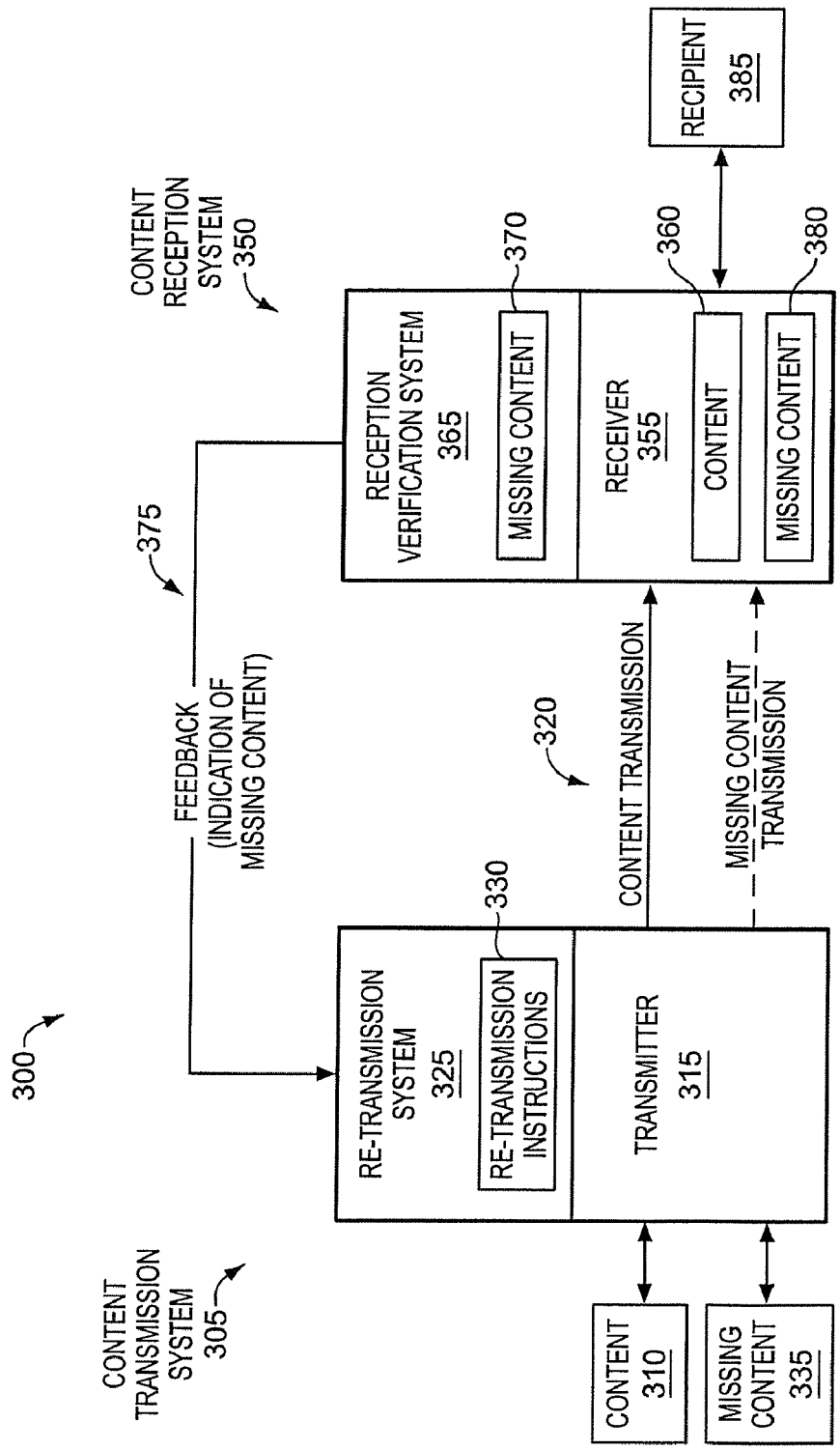
FIG. 3 conceptually illustrates a digital content transmission and reception system in which the reception system has a reception verification system and in which the transmission system has a re-transmission system, according to one embodiment.

FIG. 3 conceptually illustrates a system 300, according to one embodiment, in which a content distributor transmits content to a content receptor, the content receptor detects missing content and provides corresponding feedback, and the content distributor re-transmits at least some of the missing content to the content receptor. Advantageously, the system 300 allows for transmission and presentation to recipients of high quality content in a data-lossy environment.

A content transmission system 305 accesses content 310 and includes a transmitter 315 that transmits the content to a content reception system 350 via a first communication link 320. By way of example, the first communication link 320 may be a satellite, microwave, cable, or other link. The content reception system 350 includes a receiver 355 that receives content 360. Typically content 360 includes some but not all of the content 310.

The content reception system 350 includes a reception verification system 365 functionally coupled with the receiver 355 that determines that missing content 370 is a part of content 310 that has not been received. The reception verification system 365 provides feedback indicative of missing content to the transmission system 305 over a second communication link 375. The second communication link 375 may be a link that is commonly found in houses or businesses or that is easily and affordably installed in the houses or businesses. By way of example, the second link 375 may be a telephone line link, an xDSL link, a cable link, the Internet, and other links.

The content transmission system 305 includes a re-transmission system 325 functionally coupled with the transmitter 315 that provides an interface to the second communication link 375 and that receives the feedback indicative of the missing content. The re-transmission system 325 interprets the feedback and includes re-transmission instructions 330 to determine missing content 335 to retransmit to the content reception system 350. By way of example, the following conditional logic may represent an exemplary re-transmission instruction: "if a content is indicated to be missing, then re-transmit said content portion". The transmitter 315 transmits the missing content 335. The transmission of the missing content is indicated as a separate dashed line, for convenience and to indicate that typically the transmissions will be performed at different times, although frequently transmission of the content 310 and the missing content 335 will be performed in substantially the same way and over the same link 320.

The content reception system receives missing content 380, which may be different than missing content 335 due to losses. The content reception system may implement a method to combine missing content 380 with content 360. According to one embodiment, reception system 350 uses known identifiers of missing content portions, such as contained in missing content 370, to locate corresponding missing content portions in missing content 380, and extracts the corresponding content from 380 to fill missing content "holes" in content 360.

Although not a limitation of the invention, typically the content reception system 350 provides content 360 and at least some of missing content 380 to a recipient 385. Without limitation, consider an exemplary content reception system 350 having a display device and a memory (e.g., a cache) to store the content 360 (which may be multimedia video and audio corresponding to a feature film). Storage of the content 360 results in gaps due to missing content 370 that are at least partly filled by missing content 380. After sufficiently filling the gaps, to a desired extent, stored content is transferred from the memory to the display device for presentation to a viewing user recipient 385. Advantageously, the recipient 385 views improved multimedia content that benefits from a missing content feedback and re-transmission process that at least partly mitigates content losses due to data transmission.

Digital Television Reception Systems

Figure 4:
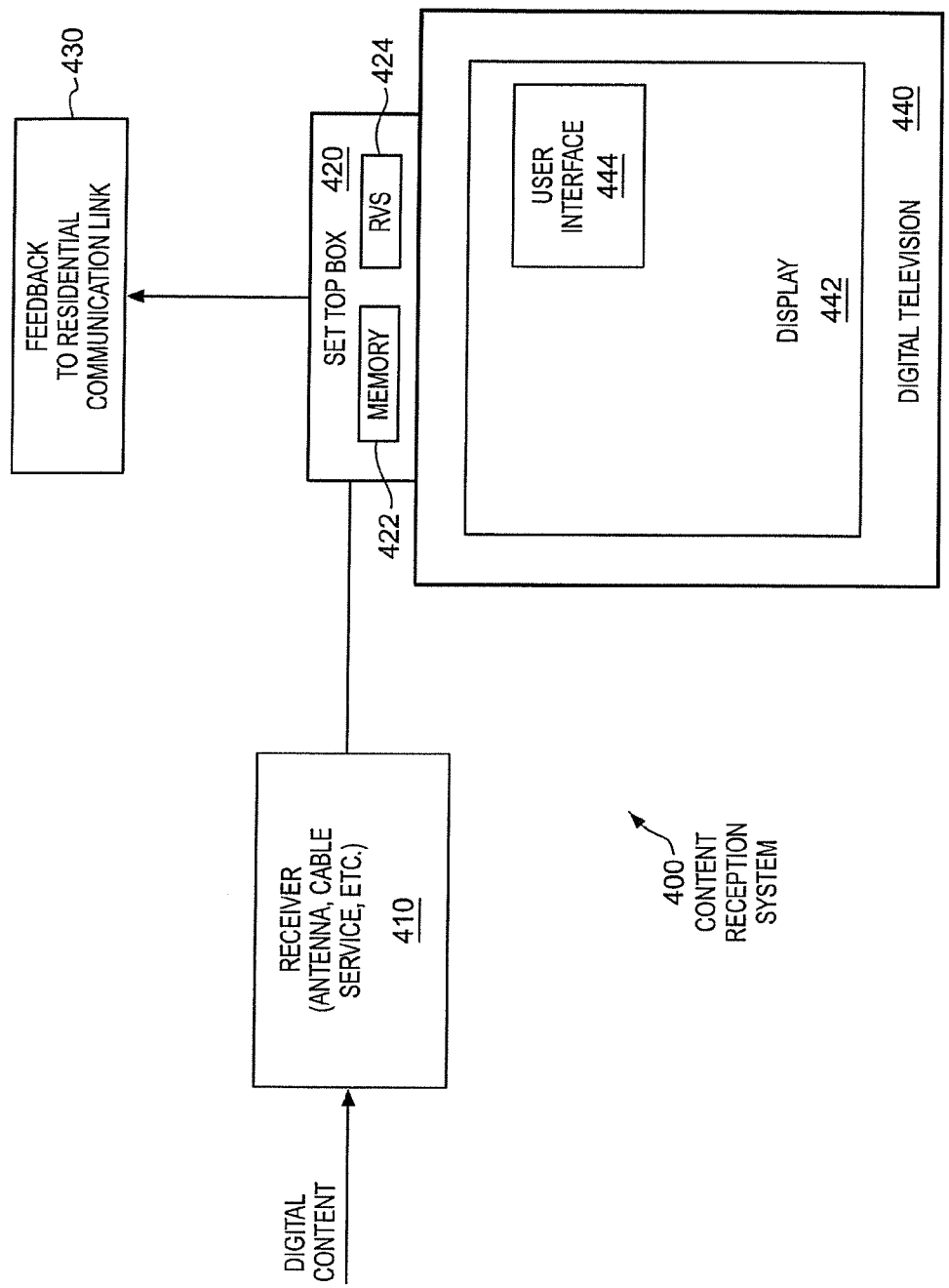
FIG. 4 conceptually illustrates a digital television content reception system, according to one embodiment.

FIG. 4 shows a digital television content reception system 400, according to one embodiment. The reception system 400 includes a receiver 410, a set top box 420, and a digital television 440. According to one embodiment, the receiver 410, the set top box 420, and the television 440, are conventional components purchased by a user. After proper installation, the user uses the set top box 420 and the receiver 410 to tune into a link and receive digital content representing software instructions including instructions to perform reception verification processing, which are stored in a programmable memory of the set top box 420. Alternatively, the system 400 may be purchased ready to receive digital content and provide described feedback.

The receiver 410 receives digital content and provides the digital content to the set top box 420. The receiver may be any conventional receiver. Typically, the receiver will be hardware, such as an antenna (e.g., rabbit ears, satellite dish, etc.) or a cable outlet that interfaces to a cable service system. The receiver is functionally and/or physically coupled with the set top box 420 to provide the digital content to the set top box 420.

The set top box 420 receives digital content from the receiver 410, provides feedback to a convenient residential communication link, such as a telephone jack, and provides digital content to the digital television 440. As shown, the set top box 420 may have a memory 422 to store digital content and a reception verification system 424 to generate the feedback 430 via a backchannel link.

The digital television 440 receives the digital content from the set top box 420. The television 440 and the box 420 are shown to be proximate, although this need not be the case. The television 440 includes a display 442 (and may additionally contain speakers and other features that are not shown) to present the digital content to a television viewer. Optionally, the digital television 440 may have a user interface capability 444 to allow the television viewer to interact with the television 440 and/or the set top box 420. For example, the interface 444 may allow the user to select content to receive, select content to view, select stored content to delete, turn off the feedback, adjust a priority indicated in the feedback, and make other indications that will be apparent to a person having an ordinary level of skill in the art, based on the discussion contained herein.

A Method for Correcting Digital Content for Losses

Figure 5:
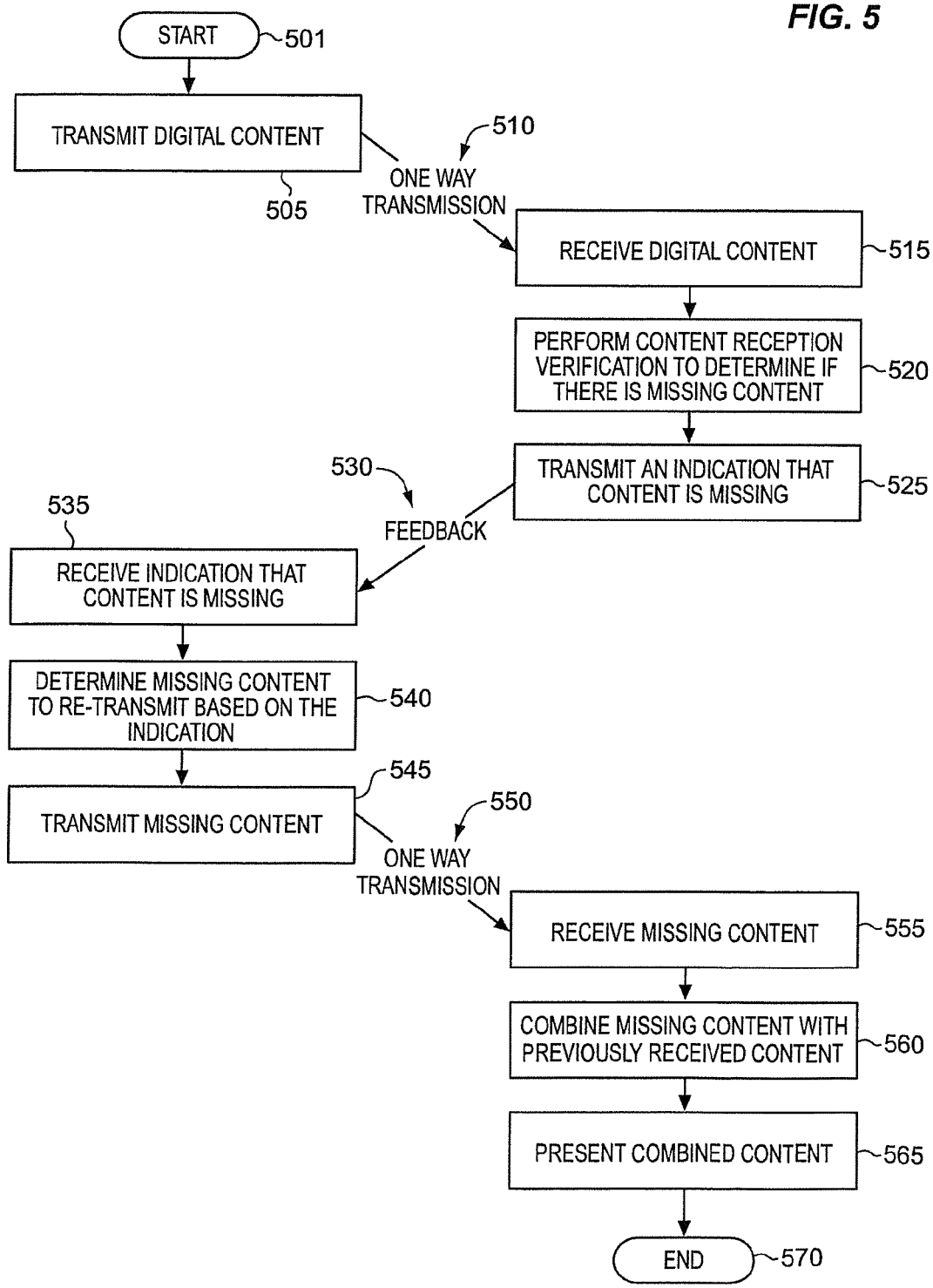
FIG. 5 conceptually illustrates in block diagram form a method, according to one embodiment, for correcting digital content for data transmission losses.

FIG. 5 illustrates in block diagram form a method 400, according to one embodiment, for correcting for data transmission losses with feedback and response. The method 500 may be implemented in logic that may include software, firmware, hardware or a combination of software, firmware, and hardware.

The method 500 commences at block 501, and then proceeds to block 505, where digital content is transmitted from a content transmission system to a content reception system. One way transmission 510 indicates that the content transmission may be performed over a substantially one way communication link, such as an electromagnetic broadcast or a satellite transmission, according to one embodiment. The digital content may include digital data indicative of a complete set of digital content. For example, a plurality of content portions may be indicated in the transmission and the chronological presentation sequence of the content portions may also be indicated.

The method 500 advances from block 505 to block 515 where digital content is received by a content reception system. According to one embodiment, the received digital content is substantially similar to, but different than, the transmitted digital content due to data transmission losses.

The method 500 advances from block 515 to block 520 where content reception verification is performed to determine if there is missing content. According to one embodiment, this includes comparing a received indication of a complete set of content portions with a set of content portions that were adequately received.

The method 500 advances from block 520 to block 525 where feedback indicative that content is missing is transmitted to the content transmission system. Feedback 530 indicates that this indication may be provided over a different communication link than the one way communication link. The feedback may be provided in different ways, including at a determined end of content transmission, according to a predetermined schedule, in real time, and by other ways.

The method 500 advances from block 525 to block 535 where the feedback is received by the content transmission system. For example, the content transmission system may receive a list of indicators corresponding to a plurality of content portions that were not received by the reception system and that have been determined to be missing.

The method 500 advances from block 535 to block 540 where missing content to be re-transmitted is determined based on the feedback. A number of such determinations have been described, and those having an ordinary level of skill in the art will appreciate that there are many additional ways and motivations to make this determination, based on the discussion contained herein.

The method 500 advances from block 540 to block 545 where the determined missing content is transmitted to the content reception system. Policy may drive determining and transmitting the missing content, rather than blindly transmitting all missing content. The transmission may be delayed and scheduled, rather than performing the transmission of missing content within a time period defined by a sliding window that moves relative to the initial transmission of a content portion. For example, feedback indicating missing content may be received, aggregated, missing content for re-transmission determined, and the determined content re-transmitted at a predetermined scheduled time, rather than during an exemplary three-minute window relative to when a content portion was initially transmitted. One way transmission 550 indicates that this missing content may be transmitted on the same one way communication link used to transmit the initial content.

The method 500 advances from block 545 to block 555 where missing content is received by the reception system. The content received may be different than the content transmitted due to transmission losses.

The method 500 advances from block 555 to block 560 where the received missing content is combined with previously received content. For example, the received missing content may be ordered in a memory according to an inherent and/or explicit order associated with the content. Since the received missing content may itself having missing content due to transmission losses during one way transmission 550, the method 500 may revisit blocks 520, 525, 535, 540, 545, 555, and 560 until the true amount of missing content has been reduced to an acceptable level.

The method 500 advances from block 560 to block 565 where the combined content is presented for consumption. For example, the content may be provided to a presentation device (e.g., television, stereo, etc.) for presentation to one or more users. The method terminates at block 570.

Figure 6:
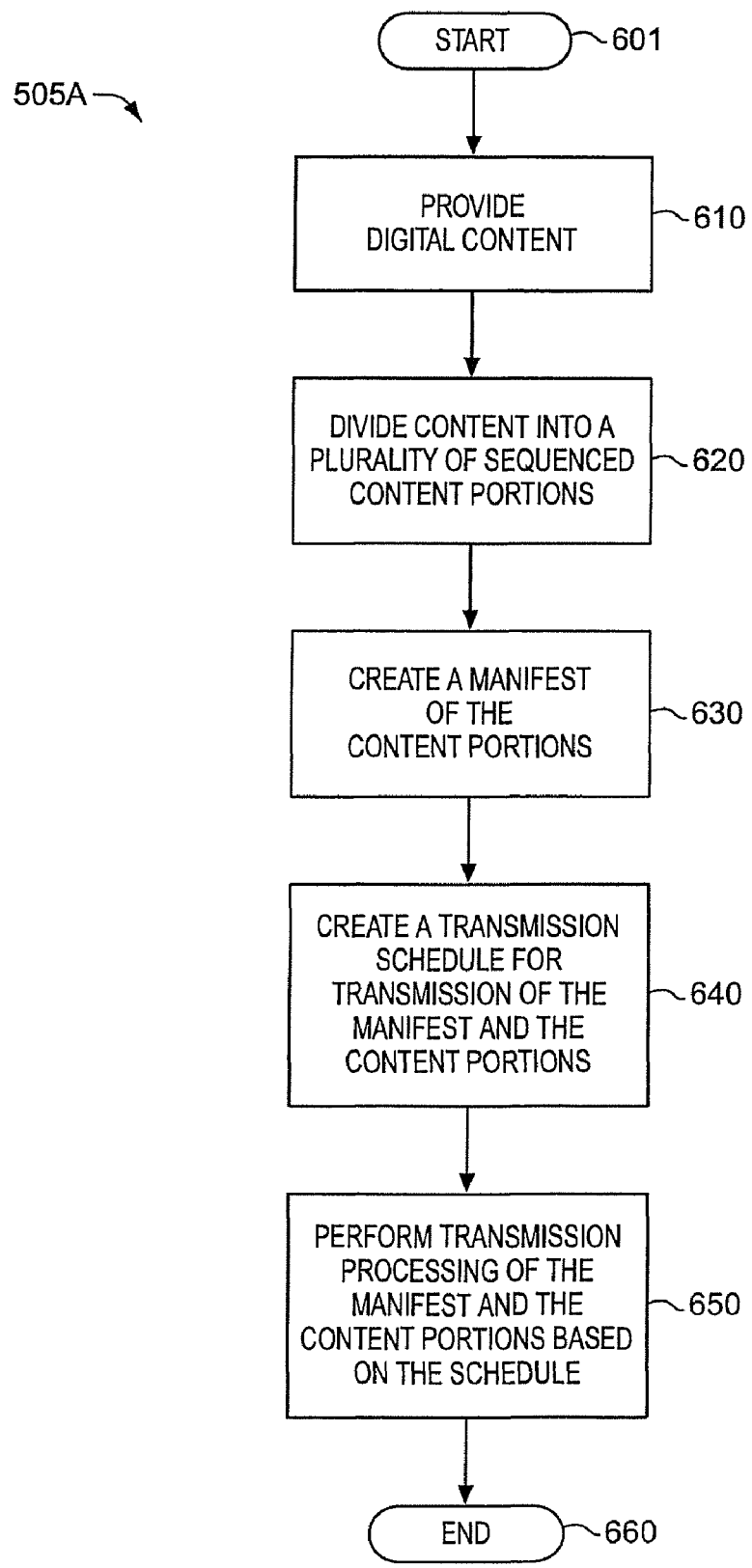
FIG. 6 conceptually illustrates in block diagram form a method, according to one embodiment, for transmitting digital content.

FIG. 6 illustrates in block diagram form a method 505A, according to one embodiment, for transmitting digital content as content portions. The method 505A may be implemented in logic that may include software, firmware, hardware or a combination of software, firmware, and hardware.

The method 505A commences at block 601, and then proceeds to block 610, where digital content is provided. This may include accessing the content from a memory, receiving the content from a networked entity (e.g., a server, a news feed, etc.), and other ways that content may be provided.

The method 505A advances from block 610 to block 620 where the content is divided into multiple content portions. Typically, the content portions will be conveniently sized, contiguous, sequentially ordered portions, such as packets. This may also include providing proper headers that contain descriptive information about the content portions including the content that the portions correspond to, an ordering, and other desired information. For example, the portion or packet may have a unique numerical identifier or a byte offset to indicate the ordering.

The method 505A advances from block 620 to block 630 where a manifest is created for the digital content. The manifest may represent a complete set of the content portions, such as through a list of identifiers of the complete set.

The method 505A advances from block 630 to block 640 where a transmission schedule for transmission of the manifest and the content portions is created. Creation of this schedule may take into consideration bandwidth, and other limitations.

The method 505A advances from block 640 to block 650 where transmission processing of the manifest and the content portions is performed according to the schedule. Transmission processing may include conventional pre-transmission processing including various forms of compression, encoding, encryption, checking, etc. In the case of video content, a number of digital video compression standards and file formats are contemplated, including Moving Picture Experts Group (MPEG) and non-MPEG standards. In the case of MPEG, MPEG-1 may be used and MPEG-2 or MPEG-4 may be used when higher resolutions are desired. Other algorithms are contemplated. For example, an algorithm to create a zip format may be used. The method 505A terminates at block 660.

A Method for Performing Content Reception Verification

Figure 7:
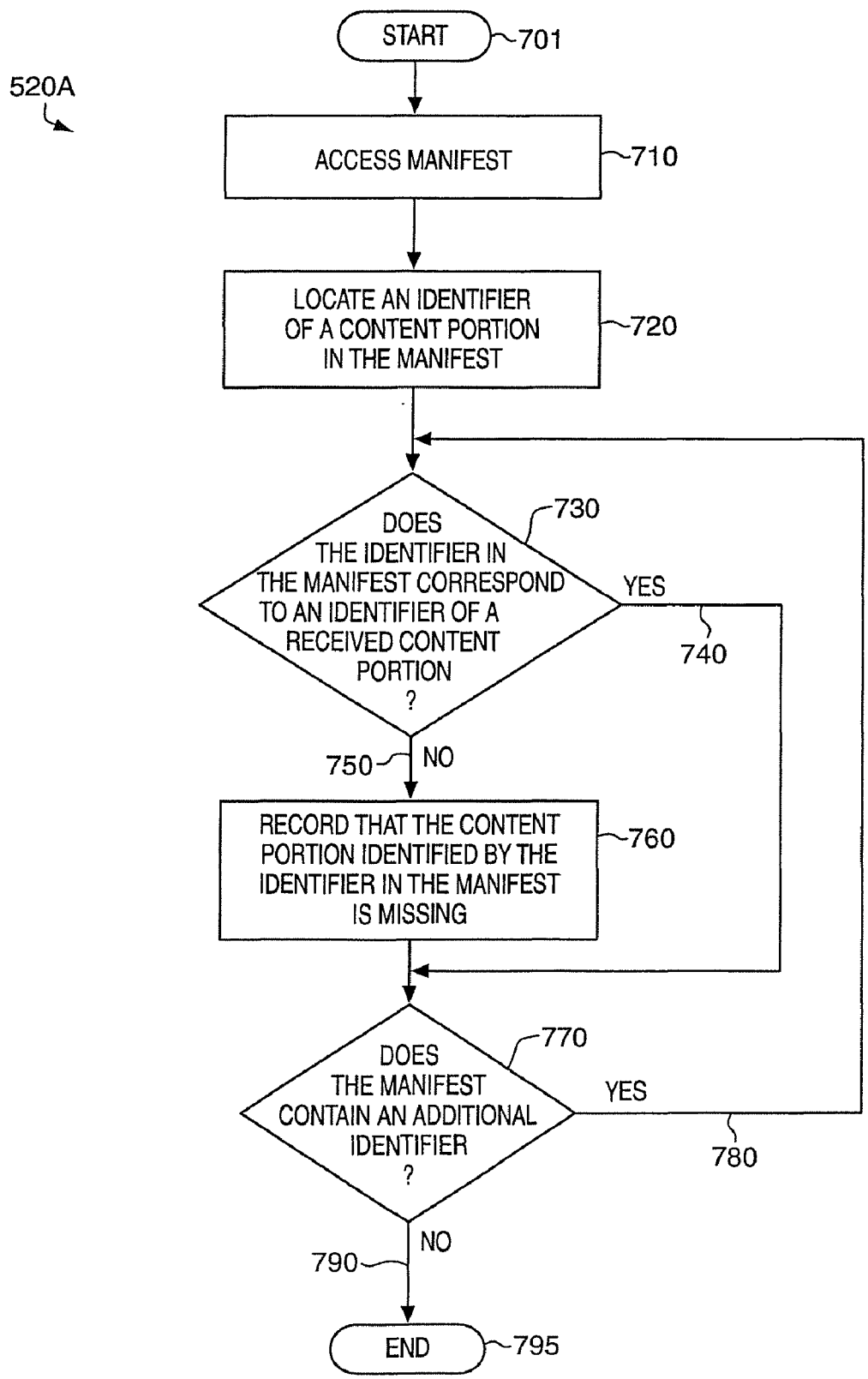
FIG. 7 conceptually illustrates in block diagram form a method, according to one embodiment, for performing content reception verification.

FIG. 7 illustrates in block diagram form a method 520A, according to one embodiment, for determining missing content. The method 520A may be implemented in logic that may include software, firmware, hardware or a combination of software, firmware, and hardware. Although the method 520A describes determination processing for a content reception system, related methods in which the content transmission system makes the determination are also contemplated.

The method 520A commences at block 701 and then advances to block 710 where a manifest is accessed. The manifest may have been received with the digital content and stored. The method 520A advances from block 710 to block 720 where the manifest is parsed to locate an identifier of a content portion.

A determination is made at decision block 730 whether the identifier corresponds to an identifier of a received content portion. This may involve a bit wise comparison of identifiers in the manifest and in the received content. If no is the determination 750 then the method 520A advances to block 760. If yes is the determination 740 then the method advances to block 770.

The method 520A advances from decision 750 to block 760 where the content portion is recorded as missing. According to one embodiment, this recording is done in a data structure, such as a log, record, file, or other data structure, that may be transmitted and interpreted by the content transmission system. Accordingly, the format of the data structure may comply with and be compatible to the transmission system.

The method 520A advances from block 760 to decision block 770 where a determination is made whether the manifest contains an additional identifier. As stated above, this may include parsing and interpreting structured data of the manifest. If yes is the determination 780, then the method 520A revisits block 730. If no is the determination 790, such as might occur if an end of file flag is encountered, then the method 520A terminates at block 795.

Figure 8:
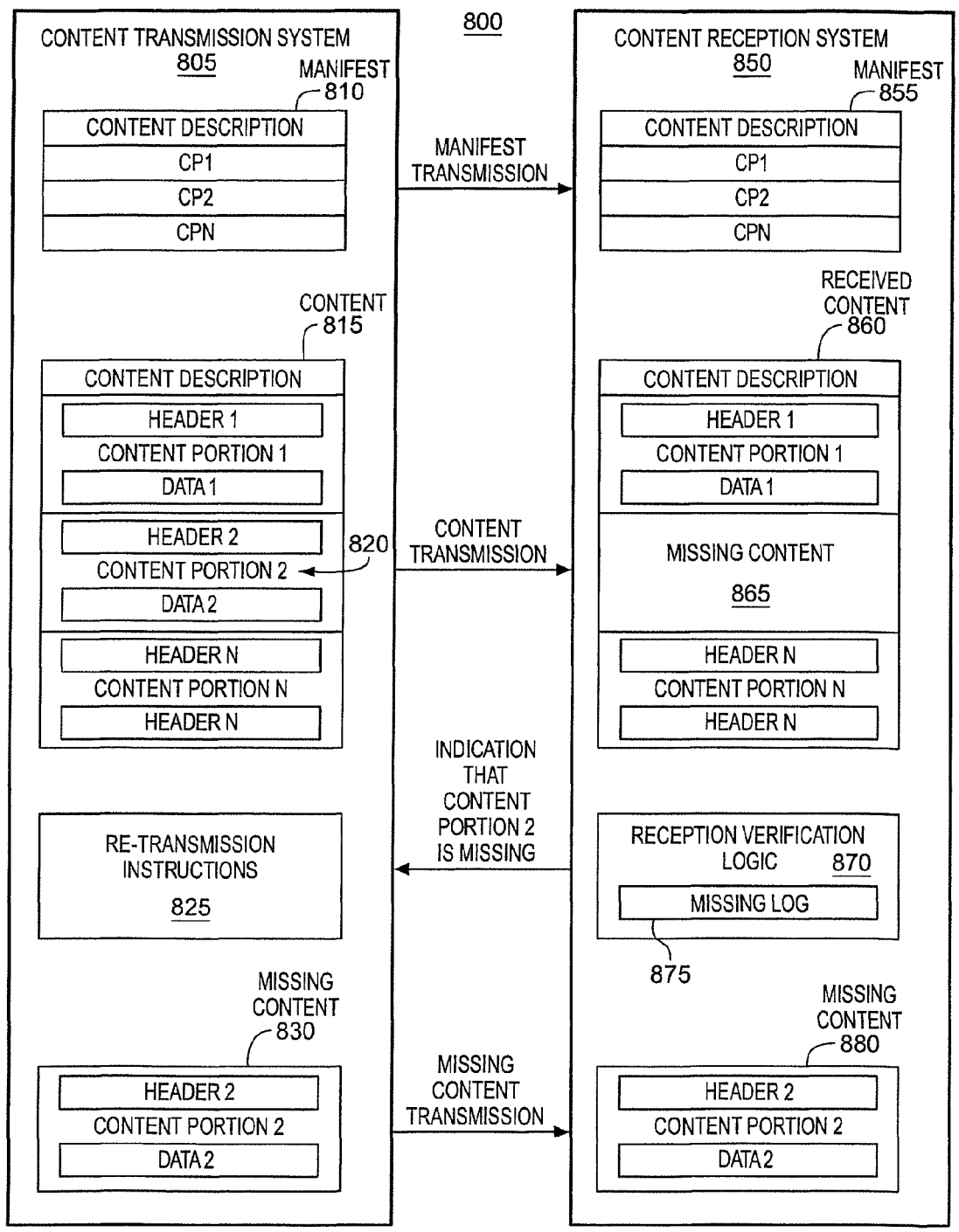
FIG. 8 conceptually illustrates a content transmission and reception system applying the methods shown in FIGS. 5, 6, and 7, according to one embodiment.

FIG. 8 conceptually illustrates a content transmission and reception system 800 using certain features of the methods illustrated in FIGS. 5, 6, and 7, to transmit and receive content based on feedback, according to one embodiment.

A content transmission system 805 transmits a manifest 810 including indicators for N content portions (CP1, . . . CPN, where N is an integer) and a content 815 including N corresponding content portions to a content reception system 850. The content portions each have headers containing descriptive information and data.

The content reception system 850 receives an identical copy of the manifest 855 and a flawed non-identical copy of the content 860 in which a content portion 2 820 is absent as indicated by missing content 865. The reception system 850 contains reception verification logic to detect missing content 865, record the missing content 865 in a journal 875, and provide an indication that content portion 2 820 is missing.

The transmission system 805 receives the indication, interprets the indication, and includes re-transmission instructions 825 to determine missing content 830, which in this case happens to be only content portion 2 820, to re-transmit to the reception system 850. In this particular case, the reception system 850 receives an identical copy of the content portion 2 880.

Figure 9:
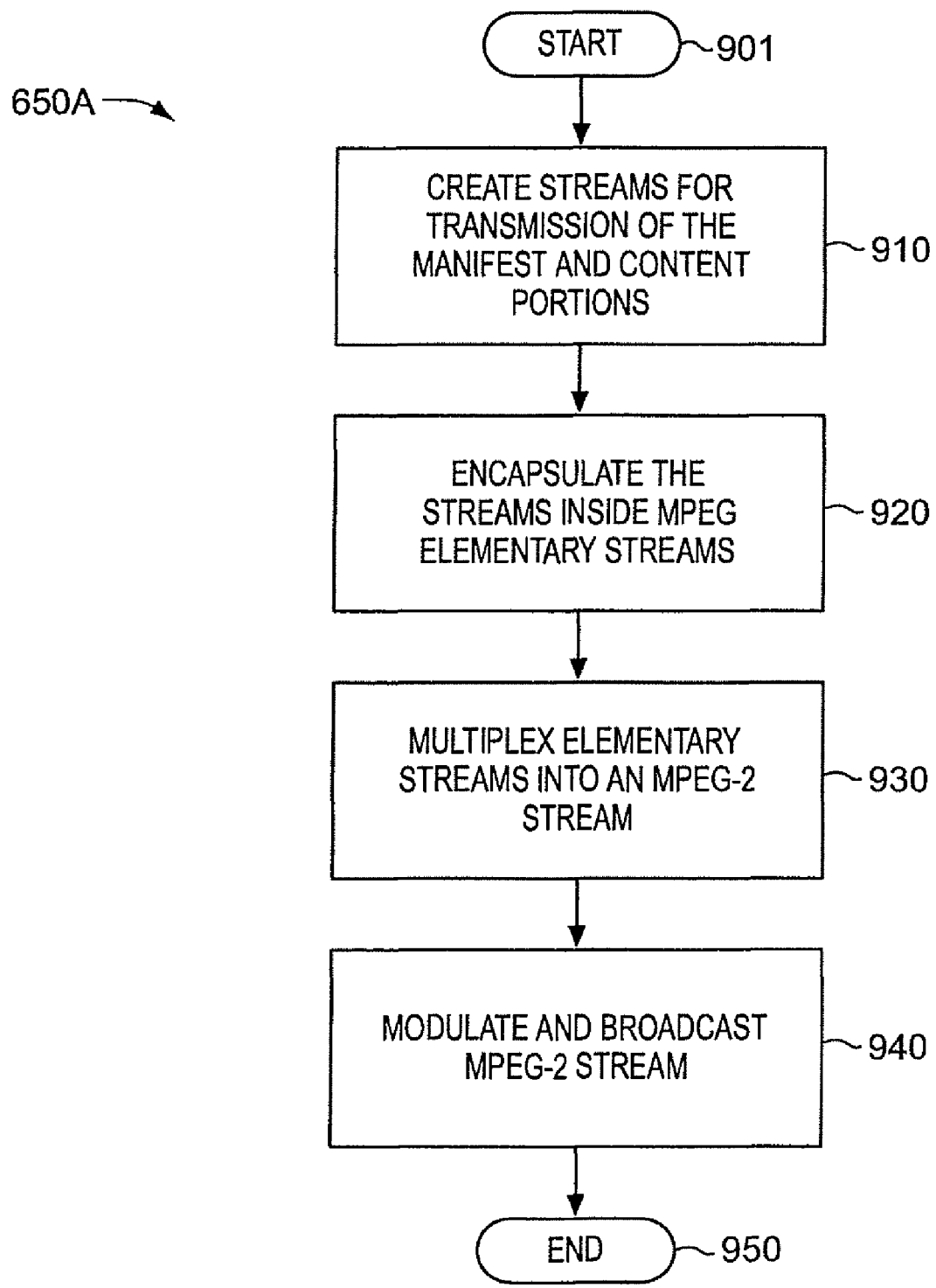
FIG. 9 conceptually illustrates in block diagram form a method, according to one embodiment, for transmitting a manifest and content portions.

FIG. 9 illustrates in block diagram form a method 650A, according to one embodiment, for transmitting content in MPEG format. The method 650A may be implemented in logic that may include software, firmware, hardware or a combination of software, firmware, and hardware.

The method 650A commences at block 901, and then proceeds to block 910, where streams are created for transmission of digital content. The method 650A advances from block 910 to block 920 where the streams are encapsulated inside MPEG elementary streams. The method 650A advances from block 920 to block 930 where elementary streams are multiplexed into an MPEG-2 stream. The method 650A advances from block 930 to block 940 where the MPEG-2 stream is modulated and transmitted (e.g., broadcast). The method 650A terminates at block 950.

Figure 10:
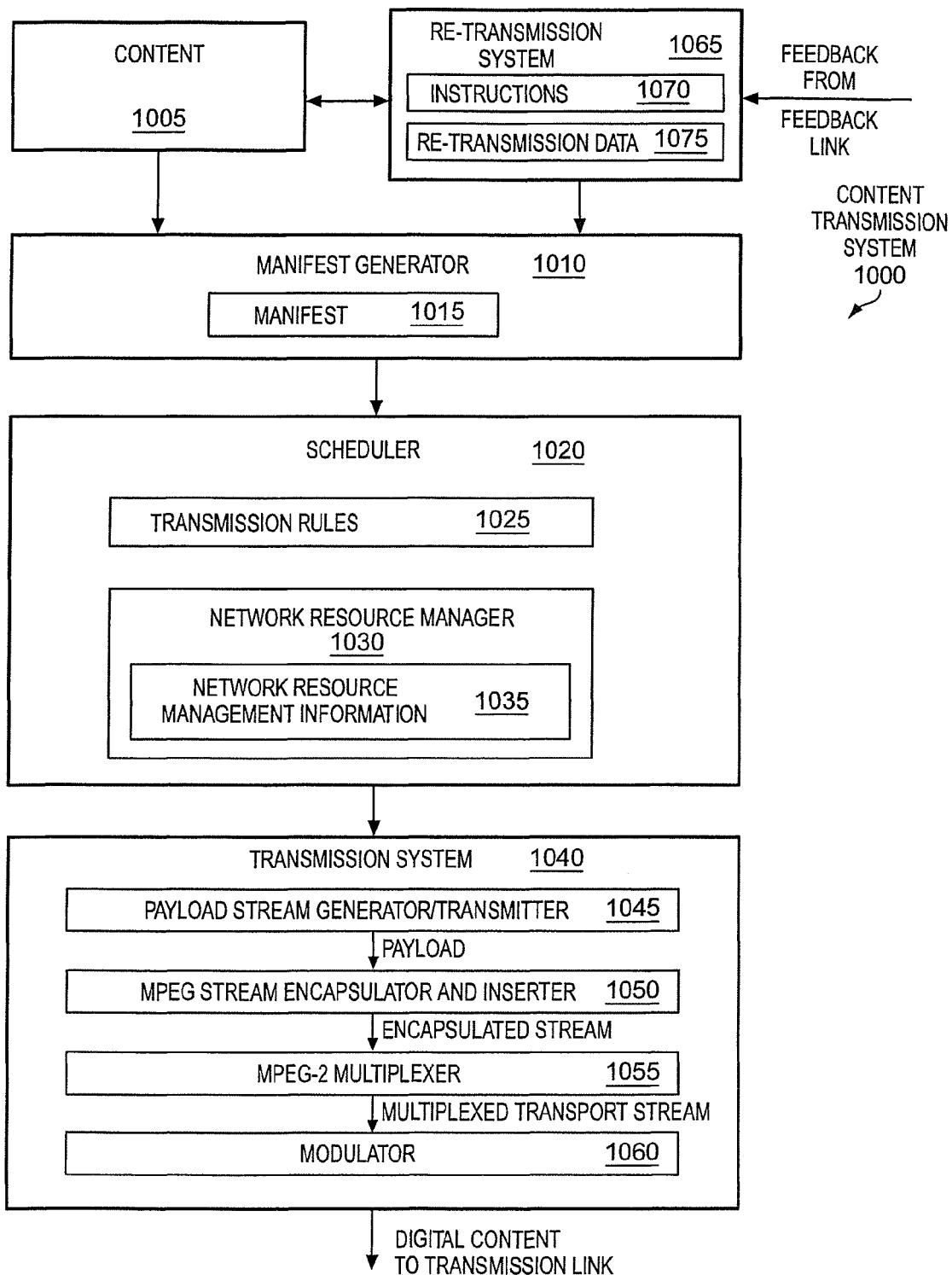
FIG. 10 conceptually illustrates exemplary components of a content transmission system, according to one embodiment.

FIG. 10 conceptually illustrates exemplary components of a content transmission system 1000, according to one embodiment. A manifest generator 1010 creates a manifest 1015 for a content 1005. A scheduler 1020 uses transmission rules 1025, such as programming and transmission parameters, and a network resource manager 1030 having access to network resource manager information 1035, such as IP multicast addresses, PIDs, bandwidth, and available timeslots, to schedule transmission of the manifest and the content. Typically, the content 1005 includes multiple content portions that are transmitted separately.

A transmission system 1040 transmits the content and the manifest as scheduled. The transmission system may use MPEG processing that includes a payload stream generator/transmitter 1045 to create a payload stream, an MPEG stream encapsulator and inserter 1050 to create an encapsulated stream, an MPEG-2 multiplexer 1055 to create a multiplexed transport stream, and a modulator 1060. The transmission system 1040 provides the digital content to the transmission link.

Typically sometime later, a re-transmission system 1065 receives feedback from a feedback link. The re-transmission system 1065 may use re-transmission instructions 1070 pre-determined for the particular implementation to determine re-transmission data 1075 based on the feedback. Typically, the data 1075 consists of a subset of the content 1005. The data 1075 may be transferred as described for the content 1005, or differently as desired.

Figure 11:
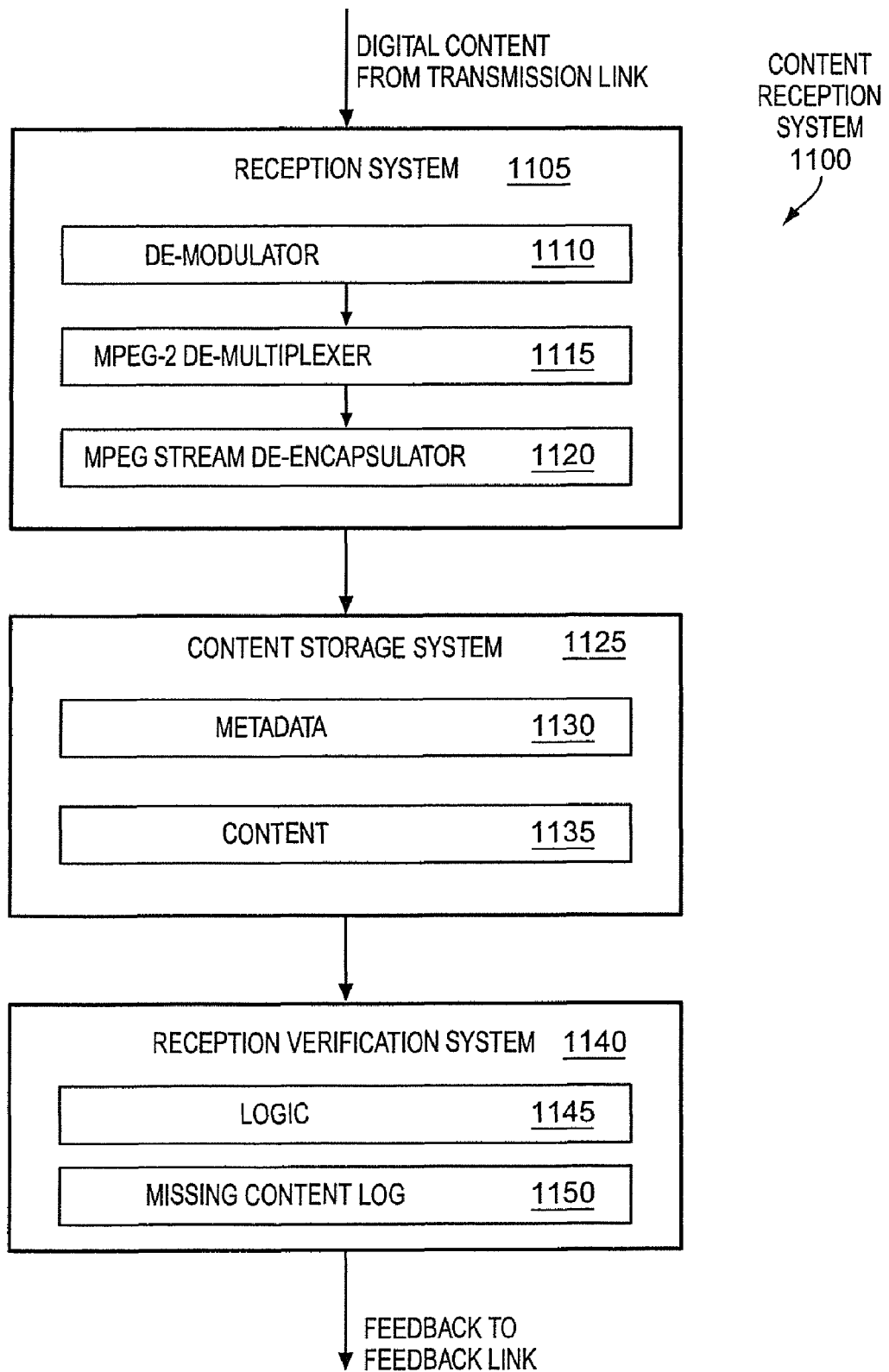
FIG. 11 conceptually illustrates exemplary components of a content reception system, according to one embodiment.

FIG. 11 conceptually illustrates exemplary components of a content reception system 1100, according to one embodiment. A reception system 1105 receives digital content from a transmission link. The reception system 1105 may typically comprise decoding modules to substantially reverse the coding of the transmission system 1000. As shown, the exemplary reception system 1105 may comprise a de-modulator 1110 to demodulate the signal, a MPEG-2 de-multiplexer 1115 to create a de-multiplexed transport stream, and an MPEG-2 stream de-encapsulator 1120 to provide a decoded payload.

The payload may be provided to a content storage system 1125 that stores metadata 1130, such as content descriptions and announcements, and content 1135. Either in real time or at the end of the transmission, a reception verification system 1140 may determine whether the content 1135 is an incomplete set of content, such as a subset of content 1005. In particular, the verification system 1140 may comprise reception verification logic 1145 to make this determination, such as by comparison of a manifest and received content as previously described, and to record missing content in missing content log 1150. Typically, if there is missing content, the system 1140 provides feedback to a feedback link. Content responsive to the feedback may be provided to the reception system 1105, and combined with content 1135, as previously described.

Correcting for Data Losses During Satellite Delivery of Multicast IP Data

To further illustrate the invention, according to one embodiment, consider without limitation an entity associated with a content transmission system that decides to broadcast a movie M to a plurality of remote and geographically distributed reception systems. The movie M is divided into three equal-sized chunks for transmission. Each chunk is given a unique identification: $C_1$, $C_2$, and $C_3$. These chunks are grouped together, or "packaged," with the unique identification P and stored in a memory.

At a predetermined and scheduled time, the transmission system accesses the package P from the memory. The transmission system may be a transmission system server S residing at a satellite uplink facility, such as a "head end". The server may feed multicast IP data downstream to an inserter. Starting with $C_1$, the server encodes the data as a series of UHTTP (Unidirectional HyperText Transport Protocol) packets that are subsequently placed on the head end's local network. By way of example, each of these packets may be 2 kilobytes in size.

The packets, UHTTP or otherwise may contain a prefacing header comprised of a sequence of bytes before the actual content bytes. Table 1 shows components of an exemplary UHTTP header.

| Name | Size | Description |
| --- | --- | --- |
| Version | 5 bits | Describes the version of the protocol. |
| ExtensionHeader | 1 bit | When set, this bit indicates that one or more extension header fields are present. |
| HTTPHeadersPrecede | 1 bit | When set to 1, HTTP-style headers precede the payload bytes. |
| CRCFollows | 1 bit | When set to 1, a 32-bit CRC is calculated on this packet. |
| PacketsInXORBlock | 1 byte | If non-zero, defines the number of packets present in the XOR block used for forward error correction. |
| RetransmitExpiration | 2 bytes | Time in seconds over which the resource may be retransmitted. |
| TransferID | 16 bytes | A Globally Unique ID for the encoded resource. |
| ResourceSize | 4 bytes | Size of the encoded resource. |
| SegStartByte | 4 bytes | Start byte in the transfer for this data segment. |
| Extension Headers | | Any extension headers, if present. |
| Data payload | | A segment of the resource's data. |
| Total length: | 28 bytes | |

The data inserter watches the head end's network for multicast traffic and captures or extracts multicast IP data, such as the UHTTP packets, off the head ends network, and multiplexes them into an MPEG-2 compliant transport stream that already contains digital television elementary streams. This multiplexed stream is then fed to a modulator that is configured to take the MPEG-2 compliant transport stream and bounce if off a satellite.

A reception system in the field has a demodulator operable to convert a signal received from a satellite back into an MPEG-2 compliant transport stream. The system tunes the demodulator to an appropriate frequency and begins to receive P from the satellite. The system includes a decoder operable to extract IP data from an MPEG-2 compliant transport stream, and pipe it to a TCP/IP stack. A transmission receiver converts multicast IP data extracted from the receiver's TCP/IP stack back into a replica of the source data.

The reception system may comprise a reception verification system to identify any missing segments of the transmission. For example, based on information indicating a complete package P, the reception system may know that it needs to receive $C_1$, $C_2$, and $C_3$ in order to successfully replicate P. One-by-one, it may examine the UHTTP-encoded packets for these identifiers, decoding and copying those containing the appropriate IDs to a data cache that is capable of holding data for local use by the reception system. After processing the entirety of P's encoded data, the reception system determines that it is missing data segments from $C_2$. By examining the content already received, it notes that it is missing the $100^{th}$ through $103^{rd}$ segments.

This information is stored until a prearranged time when the receiver will make a connection to the head end. The reception system may use a system-resident telephone modem capable of connecting to the broadcast head end either on demand, or according to a predetermined schedule to send a brief message to the transmission server containing the following information: a tag identifying the message as a repair data request, P's unique identification, $C_2$'s unique Identification, and a list of missing segments: 100, 101, 102, and 103. For example, the reception system may send a message conveying this information that has the format indicated in Table 2.

| Name | Size | Description |
|---|---|---|
| PackageID | 16 bytes | The ID of the package containing the damaged element. |
| ProtocolID | 2 bytes | An ID describing the protocol used to originally receive the resource. |
| BlockCount | 1 byte | The number of element blocks contained in this message. |
| ResourceID | 16 bytes | The unique ID of the resource with missing data. |
| SegmentCount | 2 bytes | Total number of missing segments |
| SegmentID | 4 bytes | The ID of the missing segment |

In this format, BlockCount is used to determine the total number of resource identifications present in the message. Within the block started by ResourceID, SegmentCount is used to determine how many segment identifications will be present. The exact definition of segment identification varies by protocol, but may be determined by dividing SegStartByte by the packet size for UHTTP-encoded resources. Using this format, and assuming the protocol identification for UHTTP is "1", the message sent in the preceding example may look something like: P, 1, 1, $C_2$, 4, 100, 101, 102, 103.

The transmission system may receive the request for repair data from the reception system, and may comprise a re-transmission system to combine this information into an aggregate repair data set it's creating for P using requests received from multiple other reception systems. Once completed, the availability of this set and a scheduled broadcast time is transmitted over the broadcast network. The reception system knows it needs data to complete the reception of P and tunes in or listens for transmission of such information. For example, it may tune its demodulator to the appropriate frequency. The reception system may then receive the transmission, extract segments 100, 101, 102, and 103 from the transmission, and complete the reception of P.

Exemplary Computer Architecture

As discussed herein, a "system" or "computer system", such as a system for transmitting content or receiving content, may be an apparatus including hardware and/or software for processing data. The system may include, but is not limited to, a computer (e.g., portable, laptop, desktop, server, mainframe, etc.), hard copy equipment (e.g., optical disk burner, printer, plotter, fax machine, etc.), and the like.

Figure 12:
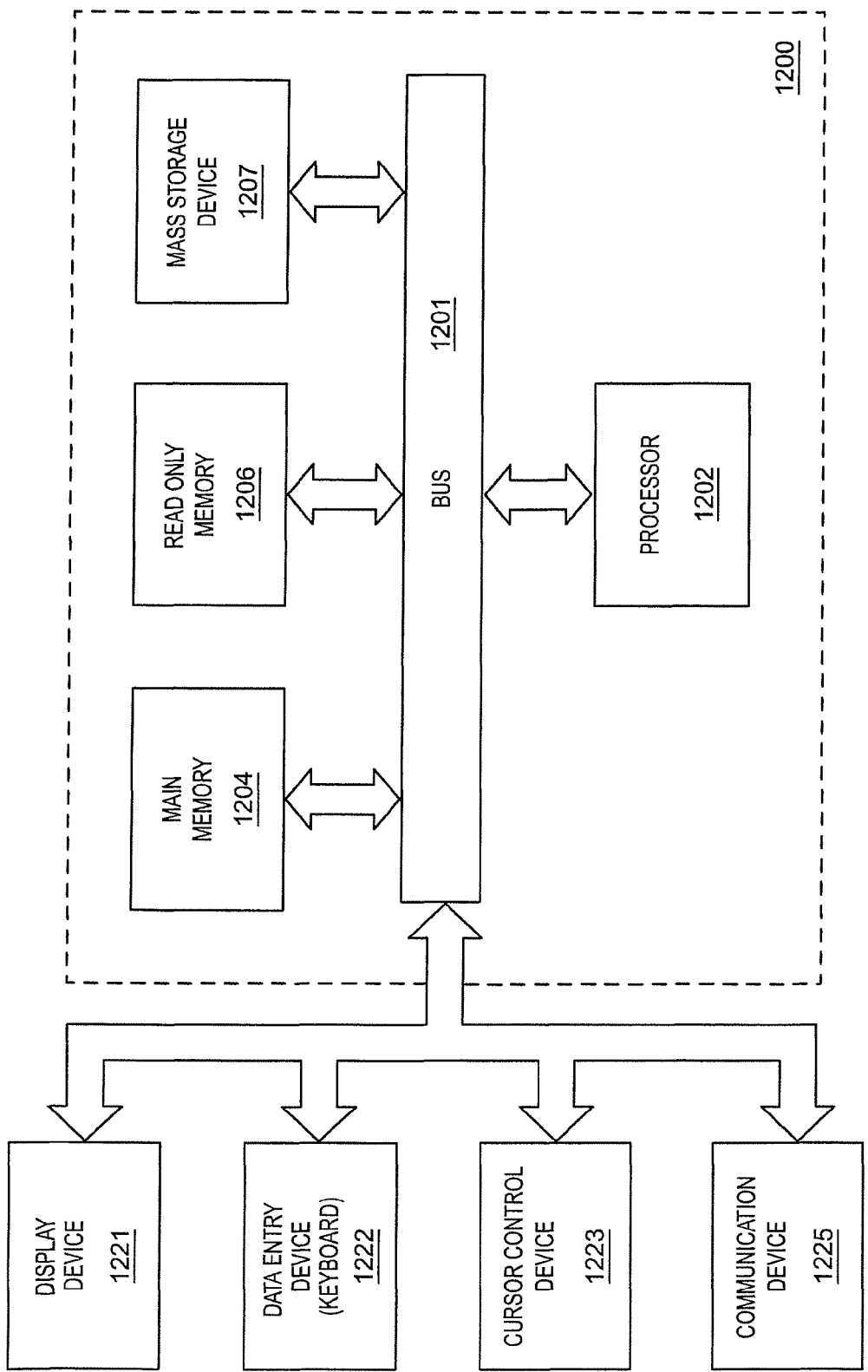
FIG. 12 conceptually illustrates in block diagram form a computer system upon which one embodiment of the present invention may be implemented.

A computer system 1200 representing an exemplary workstation, host, or server in which features of the present invention may be implemented will now be described with reference to FIG. 12. The computer system 1200 represents one possible computer system for implementing embodiments of the present invention, however other computer systems and variations of the computer system 1200 are also possible. The computer system 1200 comprises a bus or other communication means 1201 to communicate information, and a processing means such as processor 1202 coupled with the bus 1201 to process information. The computer system 1200 further comprises a random access memory (RAM) or other dynamic storage device 1204 (referred to as main memory), coupled with the bus 1201 to store information and instructions to be executed by the processor 1202. The main memory 1204 also may be used to store temporary variables or other intermediate information during execution of instructions by the processor 1202. In one embodiment, the main memory 1204 may be used to store the operating system, application programs, predetermined coded instructions, rule sets, data structures, and other types of data. The computer system 1200 also comprises a read only memory (ROM) and other static storage devices 1206 coupled with the bus 1201 to store static information and instructions for the processor 1202, such as the BIOS. A data storage device 1207 such as a magnetic disk, zip, or optical disc and its corresponding drive may also be coupled with the computer system 1200 to store information and instructions.

The computer system 1200 may also be coupled via the bus 1201 to a display device 1221, such as a cathode ray tube (CRT) or liquid crystal display (LCD), to display information to an end user. Typically, a data input device 1222, such as a keyboard or other alphanumeric input device including alphanumeric and other keys, may be coupled with the bus 1201 to communicate information and command selections to the processor 1202. Another type of user input device is a cursor control device 1223, such as a mouse, a trackball, or cursor direction keys, to communicate direction information and command selections to the processor 1202 and to control cursor movement on the display 1221.

A communication device 1225 is also coupled with the bus 1201. Depending upon the particular implementation, the communication device 1225 may include a modem, a network interface card, or other well-known interface devices, such as those used for coupling to Ethernet, token ring, or other types of physical attachment for purposes of providing a communication link to support a local or wide area network, for example. In any event, in this manner, the computer system 1200 may be coupled with a number of clients or servers via a conventional network infrastructure, such as a company's intranet, an extranet, or the Internet, for example. The communication device may be used to present content to a transmitter device, such as an antenna, or to receive content from a receiver.

Embodiments of the invention are not limited to any particular computer system. Rather, embodiments may be used on any stand alone, transmitted, networked, or other type of computer system. For example, embodiments may be used on one or more computers compatible with NT, Linux, Windows, Macintosh, any variation of Unix, or others.

The present invention includes various operations, as described above. The operations of the present invention may be performed by hardware components or may be embodied in machine-executable instructions, which may be used to cause a general-purpose or special-purpose processor or logic circuits programmed with the instructions to perform the operations. The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection). Alternatively, the operations may be performed by a combination of hardware and software.

In conclusion, the present invention provides a system and method for transmitting and receiving content with feedback that indicates missing content. At least some of the missing content is typically re-transmitted, received, combined with the existing incomplete content, and used to improve the presentation of the content.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    transmitting a plurality of content portions representing a complete set of digital television data to each of a plurality of reception systems;
    transmitting a manifest to each of the plurality of reception systems, wherein the manifest indicates the plurality of content portions representing the complete set of the digital television data;
    receiving feedback from a reception system of the plurality of reception systems, the feedback indicating a content portion of the plurality of content portions that was not received by the reception system;
    determining content portions to retransmit with an algorithm based on whether a predetermined run-length of sequential content portions are indicated to be missing in the received feedback; and
    retransmitting the content portion based on the received feedback indicating the content portion.

2. A method comprising:
    transmitting a plurality of content portions representing a complete set of digital television data to each of a plurality of reception systems;
    transmitting a manifest to each of the plurality of reception systems, wherein the manifest indicates the plurality of content portions representing the complete set of the digital television data;
    receiving feedback from a reception system of the plurality of reception systems, the feedback indicating a content portion of the plurality of content portions that was not received by the reception system;
    determining content portions to retransmit with an algorithm based on how frequently a content portion is reported to be missing from a plurality of reception systems; and
    retransmitting the content portion based on the received feedback indicating the content portion.

3. The method of claim 2, wherein said transmitting the manifest comprises transmitting a manifest that includes an identifier for each of the plurality of content portions representing the complete set of the digital television data.

4. The method of claim 2, wherein said transmitting the content portions comprises transmitting content portions that each have an identifier corresponding to an identifier in the manifest.

5. The method of claim 2, wherein said transmitting the complete set of digital television data comprises performing one of broadcasting and narrowcasting.

6. The method of claim 2, wherein determining the content portions to retransmit comprises determining the content portions to retransmit based on a type of the digital television data.

7. The method of claim 2, further comprising: scheduling a timeslot for retransmitting the content portion; and broadcasting the timeslot.

8. The method of claim 2, wherein retransmitting the content portion is performed at a regularly scheduled timeslot.

9. A method comprising:
    transmitting a plurality of content portions representing a complete set of digital television data to each of a plurality of reception systems;
    transmitting a manifest to each of the plurality of reception systems, wherein the manifest indicates the plurality of content portions representing the complete set of the digital television data;
    receiving feedback from a reception system of the plurality of reception systems, the feedback indicating a content portion of the plurality of content portions that was not received by the reception system;
    determining content portions to retransmit with an algorithm based on how strongly quality is affected by content portions that are missing; and
    retransmitting the content portion based on the received feedback indicating the content portion.

10. The method of claim 9, wherein determining the content portions to retransmit comprises determining the content portions to retransmit based in part on achieving compliance with a guaranteed level of quality.

11. The method of claim 9, wherein determining the content portions to retransmit comprises determining the content portions to retransmit based in part on a user preference.

12. The method of claim 9, wherein determining the content portions to retransmit comprises determining the content portions to retransmit based in part on a type of the digital television data.

13. The method of claim 9, wherein retransmitting the content portion comprises retransmitting the content portion over a different communication link than the plurality of content portions representing the complete set are transmitted over.

14. The method of claim 9, wherein retransmitting the content portion comprises retransmitting the content portion over a channel with a lower bandwidth than a channel over which the plurality of content portions representing the complete set are transmitted over.

15. A content transmission system comprising:
    a transmitter to transmit a plurality of content portions representing a complete set of digital television data to each of a plurality of reception systems, and to transmit a manifest to each of the plurality of reception systems, the manifest to indicate the plurality of content portions that represent the complete set of the digital television data; and
    a re-transmission system coupled with the transmitter, the re-transmission system to receive feedback from each of the plurality of reception systems, each feedback to indicate one or more content portions, of the plurality of content portions representing the complete set, that were not received by a corresponding reception system, the re-transmission system to determine content portions to re-transmit to the plurality of reception systems by using an algorithm based on how frequently content portions are reported to be missing from the plurality of reception systems in the feedback from the reception systems, the re-transmission system to re-transmit the determined content portions to the plurality of reception systems.

16. The content transmission system of claim 15, wherein the manifest is to include an identifier for each of the plurality of content portions representing the complete set of the digital television data, and wherein the content portions representing the complete set are to each have an identifier corresponding to an identifier in the manifest.

17. The content transmission system of claim 15, wherein the re-transmission system is to determining the content portions to retransmit also based on a type of the digital television data.

18. A content transmission system comprising:

a transmitter to transmit a plurality of content portions representing a complete set of digital television data to each of a plurality of reception systems, and to transmit a manifest to each of the plurality of reception systems, the manifest to indicate the plurality of content portions that represent the complete set of the digital television data; and a re-transmission system coupled with the transmitter, the re-transmission system to receive feedback from each of the plurality of reception systems, each feedback to indicate one or more content portions, of the plurality of content portions representing the complete set, that were not received by a corresponding reception system, the re-transmission system to determine content portions to re-transmit to a given reception system by using an algorithm based on how strongly quality is affected by content portions that are missing from the given reception system as indicated in the feedback from the given reception system, and the re-transmission system to re-transmit the determined content portions to the given reception system.

19. The content transmission system of claim 18, wherein the re-transmission system is to determine the content portions to retransmit based in part on achieving compliance with a guaranteed level of quality.

20. The content transmission system of claim 18, wherein the re-transmission system is to determine the content portions to retransmit based in part on a user preference.

21. The content transmission system of claim 18, wherein the re-transmission system is to determine the content portions to retransmit based in part on a type of the digital television data.

22. The content transmission system of claim 18, wherein the determined content portions are to be retransmitted over a different communication link than the plurality of content portions representing the complete set are to be transmitted over.

23. The content transmission system of claim 18, wherein the determined content portions are to be retransmitted over a channel having a lower bandwidth than a channel over which the plurality of content portions representing the complete set are to be transmitted over.

\* \* \* \* \*